(12) United States Patent
Greenzeiger et al.

(10) Patent No.: US 9,141,504 B2
(45) Date of Patent: Sep. 22, 2015

(54) PRESENTING STATUS DATA RECEIVED FROM MULTIPLE DEVICES

(75) Inventors: Michael Froimowitz Greenzeiger, Santa Clara, CA (US); Mehul K. Sanghavi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 13/535,995

(22) Filed: Jun. 28, 2012

(65) Prior Publication Data

US 2014/0006955 A1    Jan. 2, 2014

(51) Int. Cl.
*G06F 3/01* (2006.01)
*G06F 15/16* (2006.01)
*G06F 11/30* (2006.01)
*G06F 11/32* (2006.01)

(52) U.S. Cl.
CPC ........ *G06F 11/3006* (2013.01); *G06F 11/3055* (2013.01); *G06F 11/328* (2013.01)

(58) Field of Classification Search
CPC   G06F 11/3055; G06F 11/3006; G06F 11/328
USPC ............. 719/318; 700/27; 705/7.15; 715/733
See application file for complete search history.

(56) References Cited

U.S. PATENT DOCUMENTS

| | | |
|---|---|---|
| 5,128,981 A | 7/1992 | Tsukamoto et al. |
| 5,408,519 A | 4/1995 | Pierce et al. |
| 5,459,306 A | 10/1995 | Stein et al. |
| 5,600,364 A | 2/1997 | Hendricks et al. |
| 5,613,213 A | 3/1997 | Naddell et al. |

(Continued)

FOREIGN PATENT DOCUMENTS

| | | |
|---|---|---|
| BE | 1015704 | 7/2005 |
| DE | 19941461 | 3/2001 |

(Continued)

OTHER PUBLICATIONS

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010), Jul. 24, 2006.

(Continued)

*Primary Examiner* — Jennifer To
*Assistant Examiner* — John Repsher, III
(74) *Attorney, Agent, or Firm* — Novak Druce Connolly Bove + Quigg LLP (57) ABSTRACT

Disclosed herein are systems, methods, and non-transitory computer-readable storage media for presenting status data received from multiple computing devices in a single central interface. A computing device can be configured to gather and transmit status data. Status data can include any type of data known or discoverable by a computing device. The computing device can also be configured to receive status data from other computing devices and display the status data in a central interface. This functionality can be implemented as part of the operating system running on the computing device. The computing device can also utilize the received status data to select performance options regarding the performance of the computing device. For example, a computing device can select to disable functionality that requires the availability of a target computing device upon a determination that the target computing device is unavailable.

15 Claims, 4 Drawing Sheets

| | | | | | | | | | |
|---|---|---|---|---|---|---|---|---|---|
| 305—Devices | On/Off | Battery | Locked | Location | Connectivity | Status | | | |
| Home PC | On | | | Sunnyvale | WiFi - High | In Use | | | |
| My Phone | On | 55% | 🔒 | Cupertino | 3G - Low | Idle | | | |
| My tablet | Off | | | | | | | | |
| 310—Users | Phone | FaceTime | IMessage | Email | Location | Vital Signs | Calories | Prescriptions | |
| Alice | Available | Available | Available | 0 | Home | 92 bpm | 1050 | | |
| Bob | Available | Unavailable | Available | 2 | Cupertino | | | 330 | |
| Chris | Unavailable | Unavailable | Unavailable | 1 | | | | Refill waiting | |
| 315—Places | Locked | Temp. | Alarm | | | | | | |
| Home | Unlocked | 72° | Inactive | | | | | | |
| Business | Locked | 68° | Active | | | | | | |
| 320—Vehicles | Status | Fuel | Locked | Maintenance | | | | | |
| My Car | Parked | Low | Locked | Tire pressure low | | | | | |
| 325—Appliances | Status | Supplies | | | | | | | |
| Refrigerator | 45° | Milk low, eggs low | | | | | | | |
| Oven | Off | | | | | | | | |
| Coffee Maker | Ready | Full | | | | | | | |

(56) References Cited

U.S. PATENT DOCUMENTS

| | | | |
|---|---|---|---|
| 5,678,179 A | 10/1997 | Turcotte et al. | |
| 5,978,775 A | 11/1999 | Chen | |
| 5,978,833 A | 11/1999 | Pashley et al. | |
| 6,006,197 A | 12/1999 | d'Eon et al. | |
| 6,009,410 A | 12/1999 | LeMole et al. | |
| 6,023,700 A | 2/2000 | Owens et al. | |
| 6,055,512 A | 4/2000 | Dean et al. | |
| 6,055,513 A | 4/2000 | Katz et al. | |
| 6,057,872 A | 5/2000 | Candelore | |
| 6,097,942 A | 8/2000 | Laiho | |
| 6,253,189 B1 | 6/2001 | Feezell et al. | |
| 6,286,005 B1 | 9/2001 | Cannon | |
| 6,334,145 B1 | 12/2001 | Adams et al. | |
| 6,338,044 B1 | 1/2002 | Cook et al. | |
| 6,345,279 B1 | 2/2002 | Li et al. | |
| 6,381,465 B1 | 4/2002 | Chern et al. | |
| 6,393,407 B1 | 5/2002 | Middleton, III et al. | |
| 6,405,243 B1 | 6/2002 | Nielsen | |
| 6,408,309 B1 | 6/2002 | Agarwal | |
| 6,446,261 B1 | 9/2002 | Rosser | |
| 6,480,587 B1* | 11/2002 | Rao et al. | 379/110.01 |
| 6,502,076 B1 | 12/2002 | Smith | |
| 6,556,817 B1 | 4/2003 | Souissi et al. | |
| 6,647,269 B2 | 11/2003 | Hendrey et al. | |
| 6,684,249 B1 | 1/2004 | Frerichs et al. | |
| 6,690,394 B1 | 2/2004 | Harui | |
| 6,698,020 B1 | 2/2004 | Zigmond et al. | |
| 6,718,178 B1 | 4/2004 | Sladek et al. | |
| 6,718,551 B1 | 4/2004 | Swix et al. | |
| 6,738,978 B1 | 5/2004 | Hendricks et al. | |
| 6,795,808 B1 | 9/2004 | Strubbe et al. | |
| 6,795,863 B1* | 9/2004 | Doty, Jr. | 709/231 |
| 6,886,000 B1 | 4/2005 | Aggarwal et al. | |
| 6,889,054 B2 | 5/2005 | Himmel et al. | |
| 6,920,326 B2 | 7/2005 | Agarwal et al. | |
| 6,973,299 B2* | 12/2005 | Apfel | 455/412.2 |
| 6,990,462 B1 | 1/2006 | Wilcox et al. | |
| 7,039,599 B2 | 5/2006 | Merriman et al. | |
| 7,072,947 B1 | 7/2006 | Knox et al. | |
| 7,136,871 B2 | 11/2006 | Ozer et al. | |
| 7,149,537 B1 | 12/2006 | Kupsh et al. | |
| 7,168,084 B1 | 1/2007 | Hendricks et al. | |
| 7,203,684 B2 | 4/2007 | Carobus et al. | |
| 7,251,478 B2 | 7/2007 | Cortegiano | |
| 7,280,818 B2 | 10/2007 | Clayton | |
| 7,346,630 B2 | 3/2008 | Eichstadt et al. | |
| 7,356,477 B1 | 4/2008 | Allan et al. | |
| 7,370,002 B2 | 5/2008 | Heckerman et al. | |
| 7,403,838 B2 | 7/2008 | Deen et al. | |
| 7,539,652 B2 | 5/2009 | Flinn et al. | |
| 7,558,559 B2 | 7/2009 | Alston | |
| 7,669,212 B2 | 2/2010 | Alao et al. | |
| 7,685,019 B2 | 3/2010 | Collins | |
| 7,730,017 B2 | 6/2010 | Nance et al. | |
| 7,734,632 B2 | 6/2010 | Wang | |
| 7,747,676 B1 | 6/2010 | Nayfeh et al. | |
| 7,840,222 B2 | 11/2010 | Hampel et al. | |
| 7,856,360 B2 | 12/2010 | Kramer et al. | |
| 7,870,576 B2 | 1/2011 | Eldering | |
| 7,882,518 B2 | 2/2011 | Finseth et al. | |
| 7,903,099 B2 | 3/2011 | Baluja | |
| 7,912,843 B2 | 3/2011 | Murdock et al. | |
| 7,925,283 B2 | 4/2011 | Smith et al. | |
| 7,979,314 B2 | 7/2011 | Ulenas | |
| 7,983,949 B1 | 7/2011 | Joseph et al. | |
| 7,984,014 B2 | 7/2011 | Song et al. | |
| 8,046,797 B2 | 10/2011 | Bentolila et al. | |
| 8,046,810 B2 | 10/2011 | Srivastava | |
| 8,060,406 B2 | 11/2011 | Blegen | |
| 8,132,110 B1* | 3/2012 | Appelman et al. | 715/752 |
| 8,191,098 B2 | 5/2012 | Cooper et al. | |
| 8,196,166 B2 | 6/2012 | Roberts | |
| 8,229,458 B2 | 7/2012 | Busch | |
| 8,229,786 B2 | 7/2012 | Cetin et al. | |
| 8,380,562 B2 | 2/2013 | Toebes et al. | |
| 8,611,873 B2* | 12/2013 | Onyon et al. | 455/415 |
| 2001/0008404 A1 | 7/2001 | Naito et al. | |
| 2001/0044739 A1 | 11/2001 | Bensemana | |
| 2001/0047272 A1 | 11/2001 | Frietas et al. | |
| 2001/0051925 A1 | 12/2001 | Kang | |
| 2002/0006803 A1 | 1/2002 | Mendiola et al. | |
| 2002/0016736 A1 | 2/2002 | Cannon et al. | |
| 2002/0019829 A1 | 2/2002 | Shapiro | |
| 2002/0021307 A1* | 2/2002 | Glenn et al. | 345/753 |
| 2002/0021809 A1 | 2/2002 | Salo et al. | |
| 2002/0032771 A1 | 3/2002 | Gledje | |
| 2002/0052781 A1 | 5/2002 | Aufricht et al. | |
| 2002/0075305 A1 | 6/2002 | Beaton et al. | |
| 2002/0077130 A1 | 6/2002 | Owensby | |
| 2002/0078147 A1 | 6/2002 | Bouthors et al. | |
| 2002/0083411 A1 | 6/2002 | Bouthors et al. | |
| 2002/0099842 A1 | 7/2002 | Jennings et al. | |
| 2002/0120498 A1 | 8/2002 | Gordon et al. | |
| 2002/0128908 A1 | 9/2002 | Levin et al. | |
| 2002/0137507 A1 | 9/2002 | Winkler | |
| 2002/0138291 A1 | 9/2002 | Vaidyanathan et al. | |
| 2002/0161770 A1 | 10/2002 | Shapiro et al. | |
| 2002/0164977 A1 | 11/2002 | Link, II et al. | |
| 2002/0165773 A1 | 11/2002 | Natsuno et al. | |
| 2002/0175935 A1 | 11/2002 | Wang et al. | |
| 2003/0003929 A1 | 1/2003 | Himmel et al. | |
| 2003/0003935 A1 | 1/2003 | Vesikivi et al. | |
| 2003/0023489 A1 | 1/2003 | McGuire et al. | |
| 2003/0040297 A1 | 2/2003 | Pecen et al. | |
| 2003/0083931 A1 | 5/2003 | Lang | |
| 2003/0101454 A1 | 5/2003 | Ozer et al. | |
| 2003/0126015 A1 | 7/2003 | Chan et al. | |
| 2003/0126146 A1 | 7/2003 | Van Der Riet | |
| 2003/0130887 A1 | 7/2003 | Nathaniel | |
| 2003/0154300 A1 | 8/2003 | Mostafa | |
| 2003/0182567 A1 | 9/2003 | Barton et al. | |
| 2003/0188017 A1 | 10/2003 | Nomura | |
| 2003/0191689 A1 | 10/2003 | Bosarge et al. | |
| 2003/0197719 A1 | 10/2003 | Lincke et al. | |
| 2004/0003398 A1 | 1/2004 | Donian et al. | |
| 2004/0043777 A1 | 3/2004 | Brouwer et al. | |
| 2004/0045029 A1 | 3/2004 | Matsuura | |
| 2004/0054576 A1 | 3/2004 | Kanerva et al. | |
| 2004/0068435 A1 | 4/2004 | Braunzell | |
| 2004/0133480 A1 | 7/2004 | Domes | |
| 2004/0136358 A1 | 7/2004 | Hind et al. | |
| 2004/0158612 A1 | 8/2004 | Concannon | |
| 2004/0158858 A1 | 8/2004 | Paxton et al. | |
| 2004/0162883 A1* | 8/2004 | Oreizy et al. | 709/207 |
| 2004/0185883 A1 | 9/2004 | Rukman | |
| 2004/0192359 A1 | 9/2004 | McRaild et al. | |
| 2004/0201668 A1* | 10/2004 | Matsubara et al. | 348/14.05 |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0209649 A1 | 10/2004 | Lord | |
| 2004/0259526 A1 | 12/2004 | Goris et al. | |
| 2005/0010641 A1 | 1/2005 | Staack | |
| 2005/0021397 A1 | 1/2005 | Cui et al. | |
| 2005/0021853 A1 | 1/2005 | Parekh et al. | |
| 2005/0055408 A1 | 3/2005 | Dong | |
| 2005/0060425 A1 | 3/2005 | Yeh et al. | |
| 2005/0071224 A1 | 3/2005 | Fikes et al. | |
| 2005/0075929 A1 | 4/2005 | Wolinsky et al. | |
| 2005/0125397 A1 | 6/2005 | Gross et al. | |
| 2005/0138140 A1 | 6/2005 | Wen et al. | |
| 2005/0148350 A1 | 7/2005 | Kamphuis | |
| 2005/0186940 A1 | 8/2005 | Schatzberger et al. | |
| 2005/0228680 A1 | 10/2005 | Malik | |
| 2005/0228797 A1 | 10/2005 | Koningstein et al. | |
| 2005/0229209 A1 | 10/2005 | Hildebolt et al. | |
| 2005/0239495 A1 | 10/2005 | Bayne | |
| 2005/0239504 A1 | 10/2005 | Ishii et al. | |
| 2005/0249216 A1 | 11/2005 | Jones | |
| 2005/0267798 A1 | 12/2005 | Panara | |
| 2005/0273465 A1 | 12/2005 | Kimura | |
| 2005/0273833 A1 | 12/2005 | Soinio | |
| 2005/0289113 A1 | 12/2005 | Bookstaff | |
| 2006/0031327 A1 | 2/2006 | Kredo | |

(56) References Cited

U.S. PATENT DOCUMENTS

| | | |
|---|---|---|
| 2006/0040642 A1 | 2/2006 | Boris et al. |
| 2006/0041470 A1 | 2/2006 | Filho et al. |
| 2006/0048059 A1 | 3/2006 | Etkin |
| 2006/0059133 A1 | 3/2006 | Moritani |
| 2006/0068845 A1 | 3/2006 | Muller et al. |
| 2006/0075425 A1 | 4/2006 | Koch et al. |
| 2006/0095511 A1 | 5/2006 | Munarriz et al. |
| 2006/0109969 A1 | 5/2006 | Oh |
| 2006/0117378 A1 | 6/2006 | Tam et al. |
| 2006/0123014 A1 | 6/2006 | Ng |
| 2006/0129455 A1 | 6/2006 | Shah |
| 2006/0141923 A1 | 6/2006 | Goss |
| 2006/0161520 A1 | 7/2006 | Brewer et al. |
| 2006/0167621 A1* | 7/2006 | Dale ............................ 701/202 |
| 2006/0167747 A1 | 7/2006 | Goodman et al. |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0253327 A1 | 11/2006 | Morris et al. |
| 2006/0276170 A1 | 12/2006 | Radhakrishnan et al. |
| 2006/0276213 A1 | 12/2006 | Gottschalk et al. |
| 2006/0282319 A1 | 12/2006 | Maggio |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0004380 A1 | 1/2007 | Ylikoski |
| 2007/0011344 A1 | 1/2007 | Paka et al. |
| 2007/0016743 A1 | 1/2007 | Jevans |
| 2007/0022021 A1 | 1/2007 | Walker et al. |
| 2007/0024441 A1* | 2/2007 | Kahn et al. ................ 340/539.22 |
| 2007/0027703 A1 | 2/2007 | Hu et al. |
| 2007/0027760 A1 | 2/2007 | Collins et al. |
| 2007/0027762 A1 | 2/2007 | Collins et al. |
| 2007/0033104 A1 | 2/2007 | Collins et al. |
| 2007/0037562 A1 | 2/2007 | Smith-Kerker et al. |
| 2007/0047523 A1 | 3/2007 | Jiang |
| 2007/0061195 A1 | 3/2007 | Liu et al. |
| 2007/0061300 A1 | 3/2007 | Ramer et al. |
| 2007/0067215 A1 | 3/2007 | Agarwal et al. |
| 2007/0072631 A1 | 3/2007 | Mock et al. |
| 2007/0074262 A1 | 3/2007 | Kikkoji et al. |
| 2007/0078712 A1 | 4/2007 | Ott et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0093202 A1 | 4/2007 | Hwang et al. |
| 2007/0094066 A1 | 4/2007 | Kumar et al. |
| 2007/0100651 A1 | 5/2007 | Ramer et al. |
| 2007/0100805 A1 | 5/2007 | Ramer et al. |
| 2007/0105536 A1 | 5/2007 | Tingo, Jr. |
| 2007/0113243 A1 | 5/2007 | Brey |
| 2007/0117571 A1 | 5/2007 | Musial |
| 2007/0118592 A1 | 5/2007 | Bachenberg |
| 2007/0136457 A1 | 6/2007 | Dai et al. |
| 2007/0149208 A1 | 6/2007 | Syrbe et al. |
| 2007/0150171 A1* | 6/2007 | Tengler et al. ................ 701/123 |
| 2007/0156534 A1 | 7/2007 | Lerner et al. |
| 2007/0165599 A1* | 7/2007 | Skog et al. .................... 370/352 |
| 2007/0180147 A1 | 8/2007 | Leigh |
| 2007/0192038 A1* | 8/2007 | Kameyama ...................... 702/19 |
| 2007/0192409 A1 | 8/2007 | Kleinstern et al. |
| 2007/0198485 A1 | 8/2007 | Ramer et al. |
| 2007/0208619 A1 | 9/2007 | Branam et al. |
| 2007/0214470 A1 | 9/2007 | Glasgow et al. |
| 2007/0233671 A1 | 10/2007 | Oztekin et al. |
| 2007/0244750 A1 | 10/2007 | Grannan et al. |
| 2007/0260624 A1 | 11/2007 | Chung et al. |
| 2007/0288950 A1 | 12/2007 | Downey et al. |
| 2007/0290787 A1 | 12/2007 | Fiatal et al. |
| 2007/0300185 A1* | 12/2007 | Macbeth et al. .............. 715/825 |
| 2007/0300263 A1 | 12/2007 | Barton et al. |
| 2008/0004046 A1 | 1/2008 | Mumick et al. |
| 2008/0004958 A1 | 1/2008 | Ralph et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0040175 A1 | 2/2008 | Dellovo |
| 2008/0052158 A1 | 2/2008 | Ferro et al. |
| 2008/0065491 A1 | 3/2008 | Bakman |
| 2008/0070579 A1 | 3/2008 | Kankar et al. |
| 2008/0071875 A1 | 3/2008 | Koff et al. |
| 2008/0071929 A1 | 3/2008 | Motte et al. |
| 2008/0082620 A1* | 4/2008 | Barsness ....................... 709/207 |
| 2008/0082686 A1 | 4/2008 | Schmidt et al. |
| 2008/0091796 A1 | 4/2008 | Story et al. |
| 2008/0133344 A1 | 6/2008 | Hyder et al. |
| 2008/0140508 A1 | 6/2008 | Anand et al. |
| 2008/0215744 A1 | 9/2008 | Shenfield |
| 2008/0228568 A1 | 9/2008 | Williams et al. |
| 2008/0243619 A1 | 10/2008 | Sharman et al. |
| 2008/0249832 A1 | 10/2008 | Richardson et al. |
| 2008/0262927 A1 | 10/2008 | Kanayama et al. |
| 2008/0271068 A1 | 10/2008 | Ou et al. |
| 2008/0281606 A1 | 11/2008 | Kitts et al. |
| 2008/0288476 A1 | 11/2008 | Kim et al. |
| 2008/0288649 A1* | 11/2008 | Burckart et al. .............. 709/230 |
| 2008/0317010 A1* | 12/2008 | Naqvi et al. .................. 370/355 |
| 2008/0319836 A1 | 12/2008 | Aaltonen et al. |
| 2009/0006194 A1 | 1/2009 | Sridharan et al. |
| 2009/0029721 A1 | 1/2009 | Doraswamy |
| 2009/0049090 A1 | 2/2009 | Shenfield et al. |
| 2009/0055739 A1* | 2/2009 | Murillo et al. ................ 715/708 |
| 2009/0063249 A1 | 3/2009 | Tomlin et al. |
| 2009/0106111 A1 | 4/2009 | Walk et al. |
| 2009/0113009 A1* | 4/2009 | Slemmer et al. .............. 709/206 |
| 2009/0125377 A1 | 5/2009 | Somji et al. |
| 2009/0132395 A1 | 5/2009 | Lam et al. |
| 2009/0132942 A1* | 5/2009 | Santoro et al. ................ 715/765 |
| 2009/0138304 A1 | 5/2009 | Aharoni et al. |
| 2009/0157560 A1* | 6/2009 | Carter et al. ..................... 705/80 |
| 2009/0197619 A1 | 8/2009 | Colligan et al. |
| 2009/0204977 A1* | 8/2009 | Tavares et al. ................ 719/318 |
| 2009/0216847 A1 | 8/2009 | Krishnaswamy et al. |
| 2009/0240677 A1 | 9/2009 | Parekh et al. |
| 2009/0275315 A1 | 11/2009 | Alston |
| 2009/0286520 A1 | 11/2009 | Nielsen et al. |
| 2009/0298483 A1 | 12/2009 | Bratu et al. |
| 2010/0030647 A1 | 2/2010 | Shahshahani |
| 2010/0082397 A1 | 4/2010 | Blegen |
| 2010/0082423 A1 | 4/2010 | Nag et al. |
| 2010/0088152 A1 | 4/2010 | Bennett |
| 2010/0114654 A1 | 5/2010 | Lukose et al. |
| 2010/0125505 A1 | 5/2010 | Puttaswamy |
| 2010/0131964 A1* | 5/2010 | Firminger et al. ............ 719/318 |
| 2010/0138271 A1 | 6/2010 | Henkin |
| 2010/0146146 A1* | 6/2010 | Welts et al. ................... 709/237 |
| 2010/0151838 A1* | 6/2010 | Wormald et al. .......... 455/414.1 |
| 2010/0153216 A1 | 6/2010 | Liang et al. |
| 2010/0161424 A1 | 6/2010 | Sylvain |
| 2010/0169157 A1 | 7/2010 | Muhonen et al. |
| 2010/0169176 A1 | 7/2010 | Turakhia |
| 2010/0205615 A1 | 8/2010 | Kim et al. ..................... 719/318 |
| 2010/0257540 A1* | 10/2010 | Schuler et al. ................ 719/313 |
| 2010/0274869 A1* | 10/2010 | Warila et al. .................. 709/217 |
| 2010/0317332 A1* | 12/2010 | Bathiche et al. ............... 455/418 |
| 2011/0047594 A1 | 2/2011 | Mahaffey et al. |
| 2011/0106840 A1 | 5/2011 | Barrett et al. |
| 2011/0175754 A1* | 7/2011 | Karpinsky ..................... 340/963 |
| 2011/0209067 A1 | 8/2011 | Bogess et al. |
| 2011/0225048 A1 | 9/2011 | Nair |
| 2011/0244846 A1* | 10/2011 | Min ............................... 455/420 |
| 2011/0256904 A1* | 10/2011 | Simmons ..................... 455/556.1 |
| 2011/0260860 A1 | 10/2011 | Gupta |
| 2011/0276401 A1 | 11/2011 | Knowles et al. |
| 2011/0320981 A1* | 12/2011 | Shen et al. .................... 715/834 |
| 2012/0023212 A1* | 1/2012 | Roth et al. ..................... 709/223 |
| 2012/0188080 A1 | 7/2012 | Haupt et al. ................... 340/540 |
| 2012/0197484 A1* | 8/2012 | Nath et al. ..................... 701/32.4 |
| 2012/0260184 A1* | 10/2012 | Dawes et al. .................. 715/736 |

(56) References Cited

U.S. PATENT DOCUMENTS

| | | | | |
|---|---|---|---|---|
| 2012/0265433 | A1* | 10/2012 | Viola et al. | 701/410 |
| 2012/0324434 | A1* | 12/2012 | Tewari et al. | 717/168 |
| 2013/0005309 | A1* | 1/2013 | Clark | 455/414.1 |
| 2013/0009460 | A1* | 1/2013 | Speach | 307/9.1 |
| 2013/0029650 | A1* | 1/2013 | Xiao et al. | 455/417 |
| 2013/0151599 | A1* | 6/2013 | Santoro et al. | 709/203 |
| 2013/0176328 | A1* | 7/2013 | Pillai | 345/592 |
| 2013/0226449 | A1* | 8/2013 | Rovik et al. | 701/424 |
| 2013/0281079 | A1* | 10/2013 | Vidal et al. | 455/418 |

FOREIGN PATENT DOCUMENTS

| | | |
|---|---|---|
| DE | 10061984 | 6/2002 |
| EP | 0985309 | 3/2000 |
| EP | 1061465 | 12/2000 |
| EP | 1073293 | 1/2001 |
| EP | 1107137 | 6/2001 |
| EP | 1109371 | 6/2001 |
| EP | 1161093 | 12/2001 |
| EP | 1193955 | 4/2002 |
| EP | 1220132 | 7/2002 |
| EP | 1239392 | 9/2002 |
| EP | 1239395 | 9/2002 |
| EP | 1253542 | 10/2002 |
| EP | 1280087 | 1/2003 |
| EP | 1298945 | 4/2003 |
| EP | 1324250 | 7/2003 |
| EP | 1365604 | 11/2003 |
| EP | 1408705 | 4/2004 |
| EP | 1445703 | 8/2004 |
| EP | 1455511 | 9/2004 |
| EP | 1509024 | 2/2005 |
| EP | 1528827 | 5/2005 |
| EP | 1542482 | 6/2005 |
| EP | 1587332 | 10/2005 |
| EP | 1613102 | 1/2006 |
| EP | 1615455 | 1/2006 |
| EP | 1633100 | 3/2006 |
| EP | 1677475 | 7/2006 |
| EP | 1772822 | 4/2007 |
| GB | 2343051 | 4/2000 |
| GB | 2352856 | 2/2001 |
| GB | 2356777 | 5/2001 |
| GB | 2369218 | 5/2002 |
| GB | 2372867 | 9/2002 |
| GB | 2383149 | 6/2003 |
| GB | 2406996 | 4/2005 |
| GB | 2407002 | 4/2005 |
| GB | 2414621 | 11/2005 |
| GB | 2424546 | 9/2006 |
| JP | 2002/140272 | 5/2002 |
| JP | 2007087138 | 4/2007 |
| JP | 2007199821 | 8/2007 |
| KR | 20060011760 | 7/2004 |
| WO | 96/24213 | 8/1996 |
| WO | 97/33421 | 9/1997 |
| WO | 98/21713 | 5/1998 |
| WO | 98/37685 | 8/1998 |
| WO | 00/00916 | 1/2000 |
| WO | 00/30002 | 5/2000 |
| WO | 00/44151 | 7/2000 |
| WO | 00/62564 | 10/2000 |
| WO | 01/22748 | 3/2001 |
| WO | 01/31497 | 5/2001 |
| WO | 01/44977 | 6/2001 |
| WO | 01/52161 | 7/2001 |
| WO | 01/55892 | 8/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/77840 | 10/2001 |
| WO | 01/78425 | 10/2001 |
| WO | 01/91400 | 11/2001 |
| WO | 01/93551 | 12/2001 |
| WO | 01/97539 | 12/2001 |
| WO | 02/09431 | 1/2002 |
| WO | 02/23423 | 3/2002 |
| WO | 02/31624 | 4/2002 |
| WO | 02/44834 | 6/2002 |
| WO | 02/44989 | 6/2002 |
| WO | 02/054803 | 7/2002 |
| WO | 02/059720 | 8/2002 |
| WO | 02/069585 | 9/2002 |
| WO | 02/069651 | 9/2002 |
| WO | 02/075574 | 9/2002 |
| WO | 02/080595 | 10/2002 |
| WO | 02/084895 | 10/2002 |
| WO | 02/086664 | 10/2002 |
| WO | 02/096056 | 11/2002 |
| WO | 03/015430 | 2/2003 |
| WO | 03/019845 | 3/2003 |
| WO | 03/024136 | 3/2003 |
| WO | 03/038638 | 5/2003 |
| WO | 03/049461 | 6/2003 |
| WO | 03/088690 | 10/2003 |
| WO | 2004/034671 | 4/2004 |
| WO | 2004/054205 | 6/2004 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2004/114109 | 12/2004 |
| WO | 2005/015806 | 2/2005 |
| WO | 2005/020578 | 3/2005 |
| WO | 2005/029769 | 3/2005 |
| WO | 2005/062637 | 7/2005 |
| WO | 2005/073863 | 8/2005 |
| WO | 2005/076650 | 8/2005 |
| WO | 2005/083980 | 9/2005 |
| WO | 2005/086927 | 9/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/026505 | 3/2006 |
| WO | 2006/027407 | 3/2006 |
| WO | 2006/040749 | 4/2006 |
| WO | 2006/093284 | 9/2006 |
| WO | 2006/110446 | 10/2006 |
| WO | 2006/119481 | 11/2006 |
| WO | 2007/001118 | 1/2007 |
| WO | 2007/002025 | 1/2007 |
| WO | 2007/056698 | 5/2007 |
| WO | 2007/060451 | 5/2007 |
| WO | 2007/091089 | 8/2007 |
| WO | 2007/103263 | 9/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/009507 | 1/2009 |
| WO | 2009032856 | 3/2009 |
| WO | 2009/061914 | 5/2009 |
| WO | 2009/077888 | 6/2009 |
| WO | 2009/099876 | 8/2009 |
| WO | 2009158097 | 12/2009 |

OTHER PUBLICATIONS

"AdWords Reference Guide", Google, 2004.
"Combined Search and Examination Report", for United Kingdom Patent Application No. GB 0816228.1 dated Jan. 2009, Jan. 6, 2009.
"Combined Search and Examination Report dated Mar. 7, 2008", for United Kingdom Patent Application No. GB 0721863.9, Mar. 7, 2008.
"Communication (Combined Search and Examination Report under Sections 17 and 18(3)) dated Jan. 30, 2009 issued from the United (56) References Cited

OTHER PUBLICATIONS

Kingdom Patent Office", in related United Kingdom Application No. GB 0818145.5, 8 pages, Jan. 30, 2009.
"Communication (European Search Report) dated Jun. 26, 2008", in European Patent Application No. EP 08101394, Jun. 26, 2008.
"Communication (European Search Report) dated Oct. 17, 2008 issued by the European Patent Office", in counterpart European Patent Application EP 08156763, Oct. 17, 2008.
"Communication (International Search Report along with Written Opinion of International Searching Authority) mailed Oct. 8, 2008 issued by the International Searching Authority", in counterpart International Application PCT/EP 2008/056342, Oct. 8, 2008.
"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009.
"Communication (Search Report under Section 17 along with Examination Report under Section 18(3)) dated Oct. 6, 2008 issued by the United Kingdom Intellectual Property Office", in counterpart U.K. Application GB 0809321.3, Oct. 6, 2008.
"Communication (search report) mailed Mar. 24, 2009 issued from EP Office", in related European Application Serial No. 08158523.
"Communication (Search Report) mailed Mar. 5, 2009", Issued from the European Patent Office in Related European Application Serial No. 08158523.4, Mar. 5, 2009.
"Communication Pursuant to Article 94(3) EPC", mailed Mar. 24, 2009 issued from the EP office in related European Application Serial No. 08158523.4 (4 pages).
"Communication Pursuant to Article 94(3) EPC (European Examination Report) dated Oct. 23, 2008", issued in counterpart European Patent Application No. EP 08101394.8-1238, Oct. 23, 2008.
"Examination Report", for counterpart European Patent Application No. 08153257.4 issued Jun. 2, 2009.
"Examination Report dated Nov. 9, 2009", for European Patent Application No. EP 08159355.0, Sep. 11, 2009.
"Examination Report dated Jun. 17, 2009", issued in counterpart U.K. Application No. GB 0803273.2 by U.K. Intellectual Property Office, 4 pages.
"International Preliminary Report on Patentability", mailed Jan. 7, 2010 in related International Application PCT/EP2008/057726 (1 page), Jan. 7, 2010.
"International Preliminary Report on Patentability and Written Opinion issued Nov. 24, 2009", in International Application PCT/EP 2008/056342, Nov. 24, 2009.
"International Search Report and Written Opinion", for International Application No. PCT/FI 2006/050455, dated Jul. 25, 2007.
"International Search Report and Written Opinion mailed on Aug. 26, 2011", for PCT/US 2011/034927 titled "Content Delivery Based on User Terminal Events," to Apple Inc., Aug. 26, 2011.
"International Search Report and Written Opinion of the International Search Authority mailed Jun. 19, 2009", for International Application No. PCT/EP 2008/056069, Jun. 19, 2009.
"International Search Report and Written Opinion of the International Searching Authority mailed Feb. 11, 2009, issued by the International Searching Authority", in related International Application PCT/EP 2008/063839 (11 pages).
"International Search Report dated Nov. 25, 2008 issued by the International Searching Authority", in counterpart International Application PCT/EP 2008/057726.
"International Search Report mailed Mar. 18, 2009 in related PCT", International Application No. PCT/EP2008/057728 (4 pages).
"International Search Report mailed Mar. 24, 2009", in related PCT International Application No. PCT/EP 2008/063326 (4 pages), Mar. 24, 2009.
"Notice of Allowance dated Apr. 29, 2011", U.S. Appl. No. 11/888,680, Apr. 29, 2011, 13 pages.
"Notification Concerning Transmittal of International Preliminary Report on Patentability", (Chapter 1 of the Patent Cooperation Treaty) mailed Jan. 7, 2010 in related International Application PCT/EP2008/057728.
"Notification of Transmittal of the International Search Report and the Written Opinion of the International Searching Authority mailed Mar. 24, 2009", in related PCT International Application No. PCT/EP 2008/063326 (1 page), Mar. 24, 2009.
"Office Action dated Mar. 31, 2011 issue by the U.S. Patent Office", in related U.S. Appl. No. 12/080,124 (29 pages), Mar. 31, 2011.
"Office Action issued from the USPTO dated Aug. 20, 2009", issued in related U.S. Appl. No. 12/075,593 (14 pages), Aug. 20, 2009.
"Office Action issued from USPTO on Nov. 15, 2010 in U.S. Appl. No. 11/996,870 (13 pages)", Nov. 15, 2010.
"Office Action issued Mar. 17, 2010", in related U.S. Appl. No. 12/075,593 (11 pages), Mar. 17, 2010.
"Office Action Issued Oct. 15, 2010 by the U.S. Patent Office", in related U.S. Appl. No. 12/080,124 (28 pages), Oct. 15, 2010.
"Search Report under Section 17 dated Jul. 7, 2008", in related U.K. Application GB 0803273.2.
"U.K. Search Report under Section 17 dated Oct. 23, 2007", in U.K. Application No. 0712280.7, Oct. 23, 2007.
"United Kingdom Search Report under Section 17 dated Mar. 10, 2004", U.K. Application No. GB 0721921.5, Mar. 10, 2004.
"Written Opinion of the International Searching Authority issued Nov. 24, 2009", in International Application PCT/EP 2008/056342 (6 pages), Nov. 24, 2009.
"Written Opinion of the International Searching Authority mailed Jan. 7, 2010", International Application PCT/EP2008/057728 (6 pages), Jan. 7, 2010.
"Written Opinion of the International Searching Authority mailed Jan. 7, 2010", in related International Application PCT/EP 2008/057726 (5 pages), Jan. 7, 2010.
"Written Opinion of the International Searching Authority mailed Mar. 24, 2009 issued from the International Searching Authority", in related PCT International Application No. PCT/EP 2008/063326 (5 pages), Mar. 24, 2009.
"XP002456252—Statement in Accordance with the Notice from the European Patent Office dated Oct. 1, 2007", concerning business methods (OJ Nov. 2007; p. 592-593), Nov. 1, 2007, 592-593.
Ghose, Anindya et al., "An Empirical Analysis of Search Engine Advertising: Sponsored Search in Electronic Markets", Management Science, Informs, 2009.
Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.
Internet Reference, "Specific Media Behavioral Targeting Index", Specific Media, Inc., Irvine, CA, 2010, Available online at http://www.specificmedia.com/behavioral-targeting.php.
Karuga, Gilber G. et al., "AdPalette: An Algorithm for Customizing Online Advertisements on the Fly", Decision Support Systems, vol. 32, 2001.
Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.
Mueller, Milton, "Telecommunication Access in Age of Electronic Commerce: Toward a Third-Generation Service Policy", Nov. 1996, HeinOnline, 49. Fed. Comm L.J., Nov. 1, 1996, 655-665.
Perkins, Ed, "When to buy airfare", http://www.smartertrael.com/travel-advice/when-to-buy-airfare.html?id=1628038, Nov. 21, 2006 (4 pages), Nov. 21, 2006.
Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.
Richardson, Matthew et al., "Predicting Clicks: Estimating the Click-Through Rate for New Ads", Proceedings of the 16th international

(56) References Cited

OTHER PUBLICATIONS conference on World Wide Web, Banff, Alberta, Canada, May 8-12, 2007, Session: Advertisements & click estimates, pp. 521-529, ACM, 2007, May 8, 2007, 521-529.

Science Dictionary, Definition of "dynamic", 2002.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010), Jul. 29, 2009.

World English Dictionary, Definition of "relevant", 1998.

* cited by examiner

| 305—Devices | On/Off | Battery | Locked | Location | Connectivity | Status |
|---|---|---|---|---|---|---|
| Home PC | On | | | Sunnyvale | WiFi - High | In Use |
| My Phone | On | 55% | 🔒 | Cupertino | 3G - Low | Idle |
| My tablet | Off | | | | | |

| 310—Users | Phone | FaceTime | IMessage | Email | Location | Vital Signs | Calories | Prescriptions |
|---|---|---|---|---|---|---|---|---|
| Alice | Available | Available | Available | 0 | Home | 92 bpm | 1050 | |
| Bob | Available | Unavailable | Available | 2 | Cupertino | | | Refill waiting ←330 |
| Chris | Unavailable | Unavailable | Unavailable | 1 | | | | |

| 315—Places | Locked | Temp. | Alarm |
|---|---|---|---|
| Home | Unlocked | 72° | Inactive |
| Business | Locked | 68° | Active |

| 320—Vehicles | Status | Fuel | Locked | Maintenance |
|---|---|---|---|---|
| My Car | Parked | Low | Locked | Tire pressure low |

| 325—Appliances | Status | Supplies |
|---|---|---|
| Refrigerator | 45° | Milk low, eggs low |
| Oven | Off | |
| Coffee Maker | Ready | Full |

PRESENTING STATUS DATA RECEIVED FROM MULTIPLE DEVICES

BACKGROUND

1. Technical Field

The present disclosure relates to presenting data and, more specifically, to presenting status data received from multiple devices.

2. Introduction

Modern technology has made gathering data easier than ever. For example, computing devices can monitor a variety of things such as location, lighting level, temperature, remaining battery levels, speed, network connection type, etc. Further, wireless data connections make connecting any computing device possible. While modern computing devices and wireless connections make gathering and transmitting data easier than ever, remotely viewing all of this data still faces numerous obstacles.

For one, the variety of device types and the volume of data make viewing data from multiple devices unpractical. Even if an application or interface is provided, viewing the variety of data requires accessing multiple applications to view the data regarding each application. This is both time consuming and resource intensive and provides the user a disjointed view of the data. Secondly, the technical requirements of creating an interface such as an application to allow data from a device to be viewed remotely can be costly and outside of the expertise of many types of product manufacturers. This is especially true for devices such as appliances like an oven or microwave. While being able to remotely view data regarding these devices would be useful, creating an application to view this data remotely may not be financially worthwhile for an appliance manufacturer, especially since writing software is not an appliance maker's expertise, and thus may not be available to a user.

These obstacles result in an underutilization of the current capabilities that computers and networking provide us to share data and thus be better informed to make better decisions. As a result, time and effort are often wasted by uninformed decisions. For example, being able to quickly determine whether the oven was left on can avoid a wasted trip home or higher utility bill resulting from not returning to turn off the oven. Even smaller tasks such as calling a friend can result in wasted time if his or her cellular phone is turned off. Knowing what forms of communication are currently available to contact the friend would result in an informed decision and avoid the wasted time. Accordingly, there is a need for a way to easily share and view data from a plurality of devices so that a user can make informed decisions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for presenting status data received from multiple computing devices in a single central interface. A computing device can gather status data regarding the computing device and transmit the gathered status data to other computing devices. Status data can include any type of data known or discoverable by a computing device. Additionally, the computing device can receive status data from other computing devices and display the status data in a central interface. This functionality can be implemented as part of the operating system running on the computing device and can thus enable all computing devices running a form of the operating system to transmit and receive status data as well as display the status data.

Enabling the functionality as part of the operating system allows status data to be easily gathered and transmitted from any computing device without a need for developing software or custom interfaces. Further, displaying the status data in a central interface enables a user to quickly and easily view the status received from multiple devices and make informed decisions based on the status data.

The computing device can also utilize the received status data to select performance options regarding the performance of the computing device. For example, a computing device can select to disable functionality that requires the availability of a target computing device upon a determination that the target computing device is unavailable. Alternatively, the computing device can use status data received from a sensor on another computing device to select a performance option. For example, a computing device without a lighting sensor can adjust its display settings to be optimal for a reading received from a light sensor on another computing device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
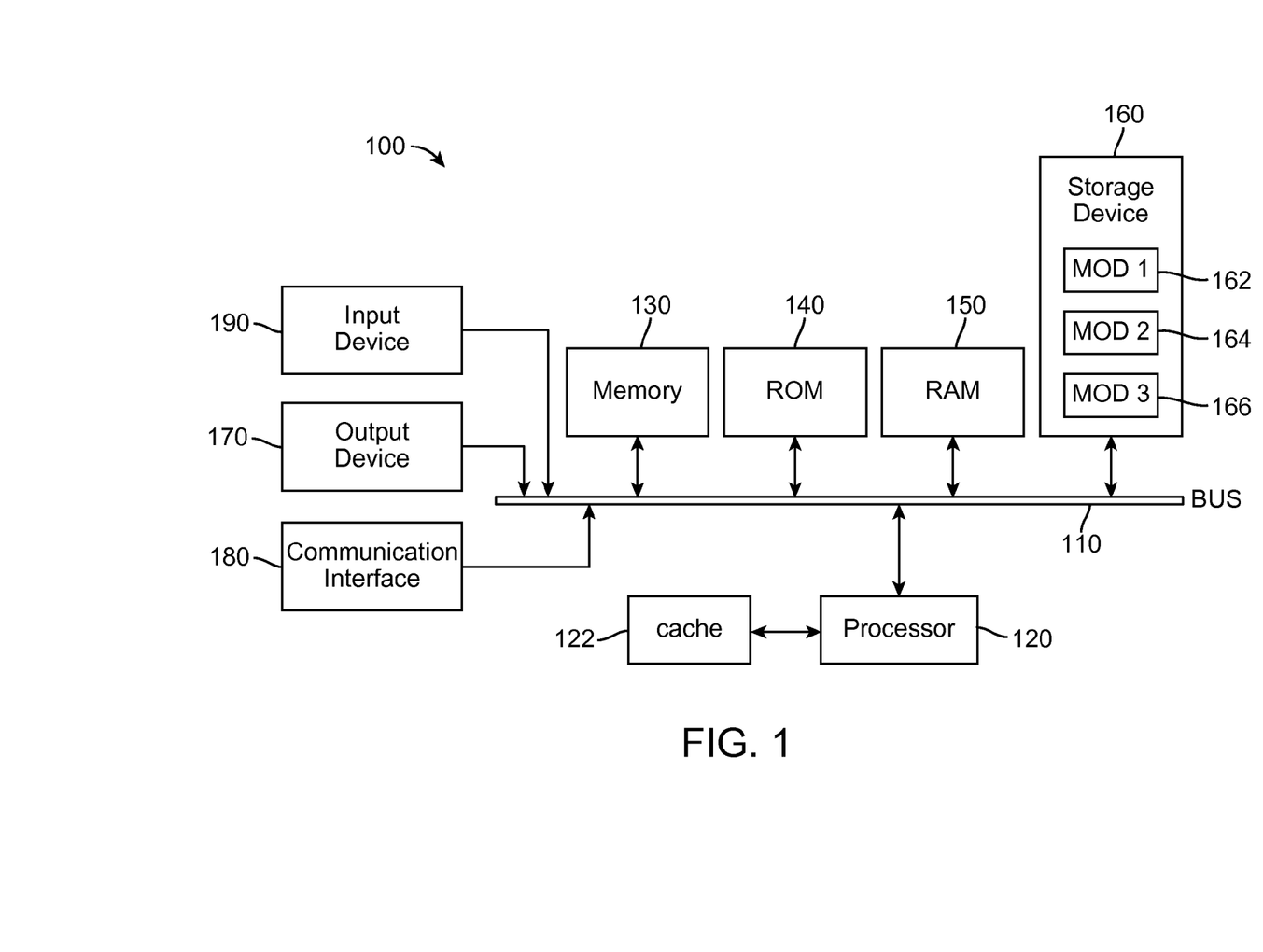
FIG. 1 illustrates an exemplary system embodiment of a general-purpose computing device.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
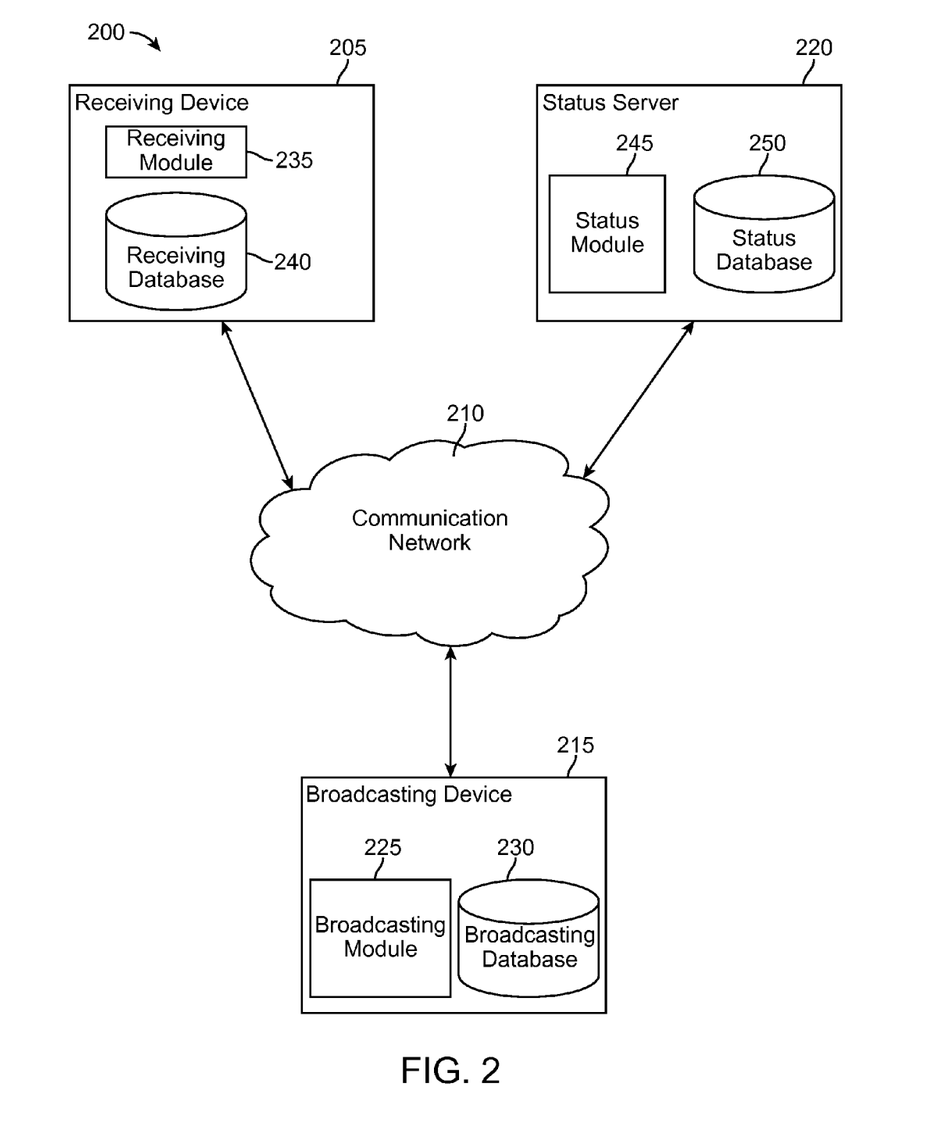
FIG. 2 illustrates a general purpose computing environment wherein multiple computing devices can communicate with each other to transmit and receive status data.

Having disclosed some components of a computing system, the disclosure now turns to FIG. 2, which illustrates a general purpose computing environment 200 wherein multiple computing devices can communicate with each other to transmit and receive status data. As illustrated, multiple computing devices can be connected to a communication network 210 to communicate with each other through use of the communication network 210. The communication network 210 can be any type of network, including a local area network ("LAN"), such as an intranet, a wide area network ("WAN"), such as the internet, or any combination thereof. Further, the communication network 210 can be a public network, a private network, or a combination thereof. The communication network 210 can also be implemented using any type or types of physical media, including wired communication paths and wireless communication paths associated with one or more service providers. Additionally, the communication network 210 can support the transmission of messages formatted using a variety of protocols such as an established transmission protocol such as Bluetooth® or other similar type of communications standard.

A computing device can be any type of general computing device capable of network communication with other computing devices. For example, a computing device can be a personal computing device such as a desktop or workstation, a business server, or a portable computing device, such as a laptop, smart phone, or a post-pc device, or any other device capable of network communication such as a computer embedded in an automobile or appliance such as a refrigerator, heart rate monitor, etc. A computing device can include some or all of the features, components, and peripherals of computing device 100 of FIG. 1.

A computing device can include a communications interface, which facilitates communication with other computing devices. The communications interface can receive a communication, such as a request, data, etc., from another computing device in network communication with the computing device and pass the communication along to an appropriate module running on the computing device. The communication interface can also send a communication to another computing device in network communication with the computing device.

As illustrated, three computing devices: a receiving device 205, a broadcasting device 215 and a status server 220 can be connected to the communication network and communicate with each other to transmit and receive status data. Status data can be any type of data known or discoverable by a computing device. For example status data can include information identifying the computing device such as the device type, manufacturer, device name, etc. Status data can also include data pertaining to the current state of the computing device such as whether the computing device is powered on, what applications are installed and/or running on the computing device, current resource usage of the computing device, location of the computing device, etc. The status data can also include data gathered by a computing device such as data gathered from sensors or components included as part of the computing device, data gathered from applications running on the computing device such as requirements of an application, or data gathered from external sources such as other computing devices connected to the computing device. These examples are only some of the possible types of status data and are not meant to be limiting. One skilled in the art would recognize that there are numerous other types of status data.

The broadcasting device 215 can gather status data and broadcast the status data to an authorized receiving device 205 that can receive the status data from the broadcasting device 215 and display the received status data in a central interface. Although the broadcasting device 215 and the receiving device 205 are discussed as two separate types of devices, this is only done for ease of explanation and is not meant to be limiting. The receiving device 205 can also be a broadcasting device 215 that can gather status data and broadcast the status data to other receiving devices and the broadcasting device 215 can also receive status data and display the received status data in a central interface.

Likewise, the number of broadcasting and receiving devices is only used as a simple example and not meant to be limiting. A broadcasting device can broadcast status data to any number of authorized receiving devices and a receiving device can receive status data from any number of broadcasting devices and display status data received from each broadcasting device in the central interface. Further, the relationship does not have to be reciprocal. For example, a broadcasting device that can also receive status data does not have to be authorized to receive status data from each receiving device to which the broadcasting device broadcasts status data. Likewise, a receiving device does not have to broadcast status data to each broadcasting device from which the receiving device receives status data.

Returning to the discussion of FIG. 2, the broadcasting device 215 can include a broadcasting module 225 that can gather status data and broadcast the status data to the receiving device 205. The broadcasting module 225 can gather status data from multiple sources, such as from hardware or software on the broadcasting device 215 as well as other devices connected to the broadcasting device. To gather the status data, the broadcasting module 215 can communicate with the operating system to request and receive status data regarding hardware and software on the device. In some embodiments, the broadcasting module 225 can be implemented as part of the operating system running on the broadcasting device 215 and thus have access to communicate with all hardware included in the device as well as all software running on the device. In some embodiments, the broadcasting module 225 can store the gathered status data in a broadcasting database 230 included in the broadcasting device 215.

The broadcasting module 225 can broadcast the gathered status data to the receiving device 205. Broadcasting the status data can include transmitting the status data to the receiving device 205. In some embodiments, the broadcasting module 225 can transmit the status data directly to the receiving device 205. For example, the broadcasting module 225 can use data identifying the receiving device 205, such as an IP address, telephone number, device name, etc., to transmit the status data directly to the receiving device 205. In some embodiments, the information identifying the receiving device 205 can be stored in the broadcasting database 230 and the broadcasting module 225 can communicate with the broadcasting database 230 to retrieve the information identifying the receiving device 205.

In some embodiments, the broadcasting module 225 can transmit the status data to the receiving device indirectly. For example, the broadcasting module 225 can transmit the status data to a status server 220 in network communication with the broadcasting device 215 and the receiving device 205 and the status server 220 can transmit the status data to the receiving device 205. For example, the status server 220 can include a status database 250 that can store a device profile for a plurality of broadcasting devices. The device profile can include data identifying all receiving devices authorized to receive status data from the broadcasting device 215. The status server can also include a status module 245 that can communicate with the status database 250 to retrieve the data identifying the receiving device 205 and transmit the status data to the receiving device 205.

The broadcasting module 225 can schedule the transmission of status data in numerous ways. For example, in some embodiments, the status data can be transmitted based on a predetermined schedule. For example, the broadcasting module 225 can transmit status data every ten minutes. In some embodiments, the broadcasting module 225 can transmit status data upon a determination that the status of the broadcasting device 215 has changed. For example, upon the broadcasting module 225 determining that the internet connection of the broadcasting device 215 has changed, the broadcasting module 225 can broadcast status data indicating the change in status.

The broadcasting module 225 can transmit different amounts of status data per transmission. For example, in some embodiments, the broadcasting module 225 can transmit all the gathered status data every time status data is transmitted.

In some embodiments, the broadcasting module 225 can transmit only a portion of the status data. For example, upon a determination that the internet connection of the broadcasting device 215 has changed, the broadcasting module 225 can transmit status data indicating only the internet connection of the broadcasting device 215.

In some embodiments, the broadcasting module 225 can vary the amount of status data transmitted based upon the situation. For example, the broadcasting module 225 can transmit all gathered status data based upon a set schedule such as every hour and transmit only a portion of the status data upon a determination that the particular status has changed.

In some embodiments, the broadcasting module 225 can broadcast status data based on the type of status data. For example, certain status data can be identified to be more important than other types of status data and thus the more important status data can be transmitted more frequently than status data considered to be less important. Alternatively, status data identified to be more important can be transmitted upon a determination that the status has changed whereas less important status data can be transmitted based on the set schedule.

In some embodiments, the broadcasting module 225 can vary the transmission of the status data based upon the receiving device 205. For example, the frequency at which status data is sent, and the types of status data that is sent can be variable based upon the receiving device 205. Thus the broadcasting device 215 can send different status data to different receiving devices 205 and send status data at different frequencies to different receiving devices 205.

In some embodiments, the broadcasting module 225 can vary the transmission of status data based upon status data received from the receiving device 205. For example, the broadcasting module 225 can limit the amount and frequency of status data that is transmitted to a receiving device 205 if, based on status data received from the receiving device 205, it is determined that the receiving device 205 is currently using a high amount of bandwidth. Alternatively, the amount and frequency of status data that is transmitted to a receiving device 205 can be limited if it is determined that the device is inactive or has not been accessed for a long period of time.

In some embodiments, wherein the broadcasting module 225 transmits status data to the receiving device 205 indirectly via the status server 220, the status module 245 can manage the status data that is transmitted to the receiving device 205, including the functionality described above.

The receiving device 205 can receive status data transmitted by the broadcasting device 205. The receiving device 205 can include a receiving module 235 to receive the status data. For example, the receiving module can be implemented as part of the operating system and await transmitted status data. In some embodiments, the receiving device 205 can include a receiving database 240 to store status data and the receiving module 235 can store the received status data in the receiving database 240.

The receiving module 235 can cause the display of the received status data in a central interface, thus enabling a user of the receiving device 205 to easily view the status of all devices from which status data was received. The receiving device 205 can present the status data in any number of ways known in the art. For example, the status data can be presented as text, icons, etc., or use a variation of different colors or images to represent the data. Further, the status data can be grouped or categorized in any number of ways.

In some embodiments, the receiving module 235 can present all of the received status data. In some embodiments, the receiving module 235 can present only a portion of the status data. For example, the receiving module 235 can determine which status data to display based on a predetermined priority list, user entered preferences, predetermined rules, etc.

Figure 3:
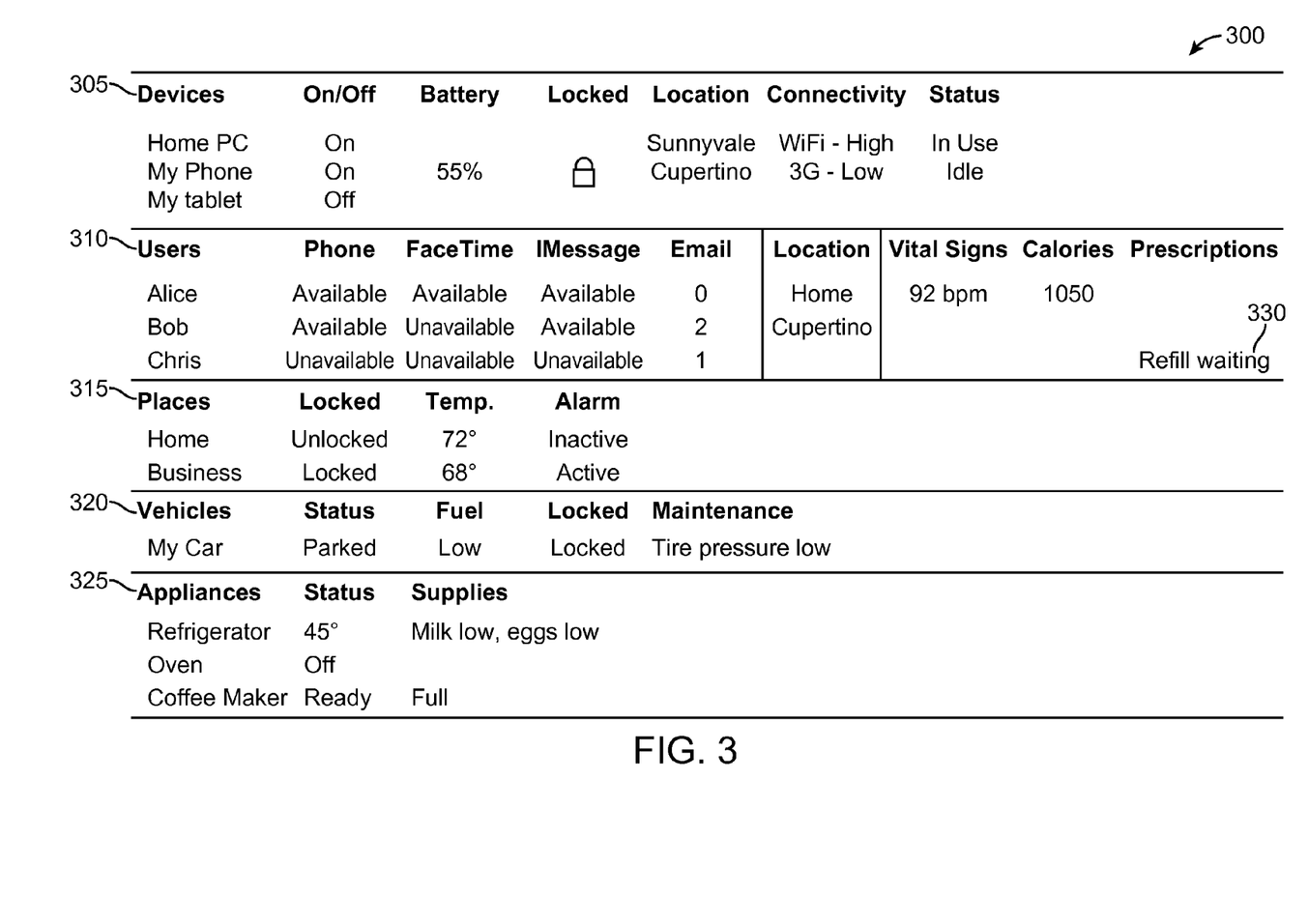
FIG. 3 illustrates a screen shot of an exemplary central interface.

FIG. 3 illustrates a screen shot of an exemplary central interface 300. As illustrated, the status data is separated into 5 categories: devices 305, users 310, places 315, vehicles 320 and appliances 325, each of which displays different types of status data. For example, the devices 305 category displays whether the device is powered on, the current battery power, whether the device is locked, the location of the device, the current internet connection type of the device and the current status of the device, whereas the places 315 category displays whether the location is locked, the current temperature and the status of the alarm.

Further, the central interface 300 can group status data from multiple devices and present it in relation to one entry. For example, the users 310 section categorizes users by name and displays status data received from multiple devices regarding the user. As illustrated, status data received from a smart phone indicating whether the user is available to receive a call, video chat, or text message is displayed as well as data received from a personal health monitoring device. Further, status data received from a pharmacy server indicates that user Chris has a prescription that is ready for pickup 330. Grouping status data in this manner allows a user to quickly and easily determine the status of each user.

The central interface 300 offers a user a quick and easy way to monitor the status of multiple devices and other users to make informed decisions. For example, a user can easily determine that user Bob is not available to receive video chat and thus can make an informed decision to select between calling Bob and messaging Bob rather than wasting time trying to engage a video chat.

Returning to FIG. 2, in addition to presenting status data so that a user can make an informed decision, the receiving module 235 can also select a performance option based upon the received status data. For example, rather than a user having to view the central interface to determine that Bob is unavailable to receive a video chat, the receiving module 235 can select to disable the functionality enabling the user to initiate a video chat with Bob while the status data indicates that Bob is unavailable to receive a video chat.

The received status data can be used to select performance options in a variety of situations. In some embodiments, status data received from a broadcasting device 215 can be used to select a performance option regarding future communications with the broadcasting device 215. For example, status data indicating the bandwidth usage of the broadcasting device 215 can be used to select which format of a media item should be transmitted to the broadcasting device 215. If the bandwidth usage of the broadcasting device 215 is high, the receiving device 205 can select to transmit a format of the media item better suited for low bandwidth to the broadcasting device 215. Alternatively, if the status data received from the broadcasting device 215 indicates that the current bandwidth usage is low, a format suited for higher bandwidth can be transmitted.

As another example, status data indicating whether a broadcasting device 215 is active can be used to select a frequency at which the receiving device 205 will transmit data to the broadcasting device 215. If the broadcasting device 215 is not active, the receiving device 205 can select to transmit data to the broadcasting device 215 less frequently, however, if the status data indicates that the broadcasting device 215 is active, the data can be sent more frequently.

In some embodiments, the status data can be used to select whether to make an application or certain functionality available on the receiving device 205. For example, status data received from a game server responsible for a multiplayer game can be used to select whether to make the game available to be executed on the receiving device 205. If the status data indicates that there are no available players, the receiving device 205 can select to not make the game available.

As another example, status data indicating the bandwidth connection of a broadcasting device 215 can be used to select whether to enable a video chat function that requires a high speed connection. If the status data indicates that the broadcasting device 215 has a slow connection speed, the video chat function to the broadcasting device 215 can be disabled.

In some embodiments, status data gathered from a sensor of the broadcasting device 215 can be used to select a performance option on the receiving device 205. For example, the receiving device 205 can use status data indicating the current input of a light sensor on the broadcasting device 215 to select the brightness level of a display on the receiving device 205.

In some embodiments, the status data received from a broadcasting device 215 can be used to select advertisements displayed on the receiving device 205. For example, if the status data indicates that the user's automobile requires an oil change, an advertisement including a coupon for an oil change can be selected to be presented on the receiving device 205.

As explained above, the broadcasting 225 and receiving 235 modules can be implemented as part of the operating system running on a computing device. This implementation offers several advantages. One advantage is that the operating system has access to all hardware and software on a computing device and thus gathering status data and using received status data to select performance options can be easily performed from the operating system level. A second advantage is that the operating system is always running on the device and thus the user does not need to initiate an application. A third advantage is that the status data is protected by the operating system and is not shared with third party applications. A fourth advantage is that the functionality can be easily implemented on multiple computing devices. For example, an appliance maker can easily implement this functionality into an oven by installing a form of the operating system on a computing device included in the oven. The oven would thus be immediately capable of gathering status data and sharing it with all other computing devices running a form of the same operating system.

Figure 4:
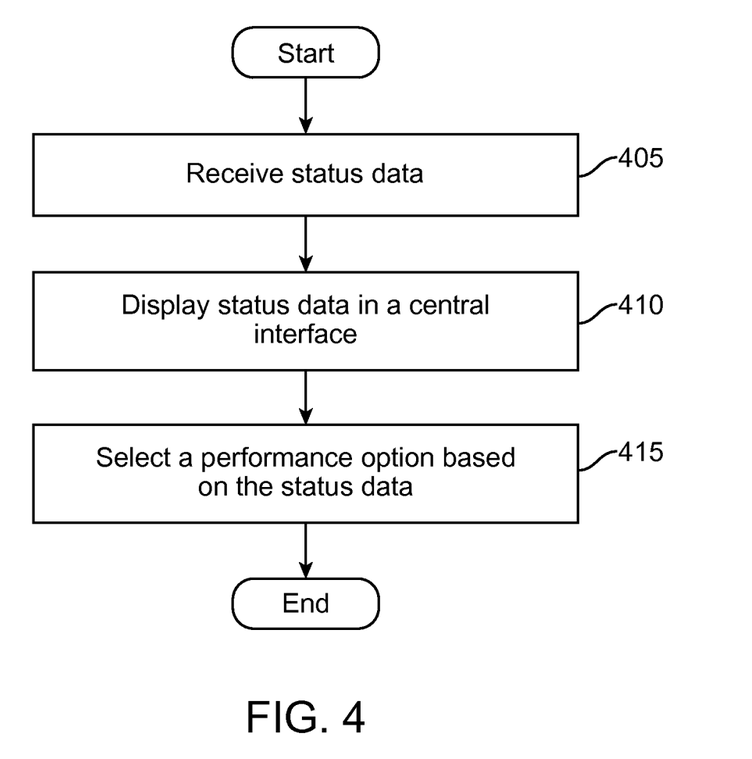
FIG. 4 illustrates an exemplary method embodiment of using status data to select performance options.

FIG. 4 illustrates an exemplary method embodiment of using status data to select performance options. As illustrated, the method begins with status data being received at a receiving device 405. As explained above, status data can be any type of data known or discoverable by a computing device. For example, status data can include data describing the computing device, such as device name, device type, hardware capabilities, etc. Status data can include data regarding the current state of the device such as current network connection, current resource usage, applications running on the device, etc. Status data can also include data discoverable by the computing device such as data received by sensors included on the computing device or data received from other computing devices in communication with the computing device.

Further, status data can be received from any number and type of computing devices capable of network connection with the receiving device. For example, status data can be received from a desktop PC, tablet, automobile, home appliances, personal body monitors, business servers, etc.

Once the status data is received by the receiving device, at block 410, the method displays the received status data in a central interface. The central interface allows a user to quickly and easily view the status data received from multiple devices in one place. The central interface can display the status data in any number of ways. For example, the status data can be displayed using text, symbols, colors, etc. Further, the status data can be grouped or categorized in any number of ways.

In some embodiments, the central interface can select which status data to display. For example, to keep the central interface easy to read, limited status data can be displayed. Status data can be selected in any number of ways, such as based on a predetermined priority or user selected preferences. Further, status data can be selected based on the specific device or type of device from which it was received, some devices being prioritized higher than others.

In some embodiments, status data can be selected based on how recent the status data was received or how critical the status data is determined to be. For example, status data indicating that an oven is on may not generally be considered of high importance, however this data becomes critical if the oven has been on for an overly extended period of time.

In some embodiments, status data from multiple computing devices can be used to ascertain what status data to display. For example, status data indicating that the oven is on and status data indicating that the alarm system is engaged can be used to determine that the oven is on and nobody is home. This can increase the priority of the status data indicating that the oven is on and thus it can be displayed in the central interface.

The displayed status data allows a user to make informed decisions, however the method can also automatically select a performance option based upon the received status data. For example, at block 415 the method can select a performance options based on the received status data. A performance option can be any variation regarding the performance of the receiving device, for example what applications to enable, what format of data to transfer, etc.

For example, the receiving device can automatically disable functionality that, based on the status data, will not succeed. For example, if the status data indicates that a user is not currently available to receive a video chat, functionality to initiate a video chat with that user can be disabled.

As another example, a mapping program running on a cellular phone can use status data received from the user's car that indicates that the user is nearly out of gas to select a route that takes a user by a gas station. In addition to selecting the altered route, in some embodiments, the mapping program can notify the user that the selected route was chosen because the user's car is low on gas.

The status data can also be used to infer the status of the user. Using the same example, status data received from a user's cellular phone and car can indicate that the two are at the same location and thus it can be inferred that, when the user initiates the mapping program, that the user will be traveling by using the car.

The above examples are only a few possibilities and are not meant to be limiting. Gathering status data from multiple computing devices and displaying the status data in one interface allows a user and the computing device to make numerous highly informed decisions. One skilled in the art would recognize that an endless number of possible embodiments can be implemented with use of the disclosed system.

As described above, one aspect of the present technology is the gathering and use of data available from various sources to improve the delivery of advertisements or any other content that may be of interest to users. The present disclosure contemplates that, in some instances, this gathered data may include personal information data that uniquely identifies or can be used to contact or locate a specific person. Such personal information data can include demographic data, location-based data, telephone numbers, email addresses, Twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method, comprising:
receiving, by a receiving computing device, status data from a broadcasting computing device of an automobile, wherein:
the receiving computing device and the broadcasting computing device are separate computing devices,
the status data describes automobile maintenance information obtained from a plurality of sensors and a location of the automobile,
the receiving computing device infers that the user will be traveling via car based on the location of the automobile being substantially similar to the location of the receiving computer device, and
the receiving computing device is presenting a travel route to a specified destination;
determining, by the receiving computing device, from the automobile maintenance information obtained from the plurality of sensors, that the automobile requires a particular maintenance service;
presenting, by the receiving computing device, an advertisement that is selected based on the particular maintenance service, the location of the automobile, and the travel route;
presenting, by the receiving computing device, the status data in a central interface that can present status data received from a plurality of broadcasting devices; and
sending, by the receiving computing device, an activity level to the broadcasting computing device, wherein the activity level includes at least one of a bandwidth currently used by the receiving computing device and an amount of time since the receiving computing device has been accessed, and wherein an amount and a frequency of the status data received from the broadcasting computing device is based on the activity level of the receiving computing device.

2. The method of claim 1, wherein the receiving computing device and the broadcasting computing device are running a form of an operating system that enables a computing device to transmit, receive and display the status data.

3. The method of claim 1, wherein the status data indicates that the broadcasting device is unavailable and in response, the receiving computing device disables functionality that requires the availability of the broadcasting computing device.

4. The method of claim 1, wherein the status data indicates an available bandwidth of the broadcasting device and the receiving computing device selects a performance option that includes transmitting data to the broadcasting device in a form determined to be optimal for the available bandwidth.

5. The method of claim 1, further comprising:
selecting a performance option based upon the status data, wherein selecting the performance option includes adjusting settings of the receiving device.

6. A receiving computing device, comprising:
a processor; and
a memory containing instructions that, when executed, cause the processor to:
receive status data from a broadcasting computing device of an automobile, wherein: the receiving computing device and the broadcasting computing device are separate computing devices,
the status data describes automobile maintenance information obtained from a plurality of sensors and a location of the automobile,
the receiving computing device infers that the user will be traveling via car based on the location of the automobile being substantially similar to the location of the receiving computer device, and
the receiving computing device is presenting a travel route to a specified destination;
determine, from the automobile maintenance information obtained from the plurality of sensors, that the automobile requires a particular maintenance service;
present an advertisement that is selected based on the particular maintenance service, the location of the automobile, and the travel route;
present the status data in a central interface that can present status data received from a plurality of broadcasting devices; and
send an activity level to the broadcasting computing device, wherein the activity level includes at least one of a bandwidth currently used by the receiving computing device and an amount of time since the receiving computing device has been accessed, and wherein an amount and a frequency of the status data received from the broadcasting computing device is based on the activity level of the receiving computing device.

7. The receiving computing device of claim 6, wherein the receiving computing device and the broadcasting computing device are running a form of an operating system that enables a computing device to transmit, receive and display the status data.

8. The receiving computing device of claim 6, wherein the status data indicates that the broadcasting device is unavailable and in response, the receiving computing device disables functionality that requires the availability of the broadcasting computing device.

9. The receiving computing device of claim 6, wherein the status data indicates an available bandwidth of the broadcasting device and the receiving computing device selects a performance option that includes transmitting data to the broadcasting device in a form determined to be optimal for the available bandwidth.

10. The receiving computing device of claim 6, further comprising instructions that cause the processor to:
select a performance option based upon the status data, wherein selecting the performance option includes adjusting settings of the receiving device.

11. A non-transitory computer-readable medium including instructions that, when executed by a receiving computing device, cause the receiving computing device to:
receive status data from a broadcasting computing device of an automobile, wherein: the receiving computing device and the broadcasting computing device are separate computing devices,
the status data describes automobile maintenance information obtained from a plurality of sensors and a location of the automobile,
the receiving computing device infers that the user will be traveling via car based on the location of the automobile being substantially similar to the location of the receiving computer device, and
the receiving computing device is presenting a travel route to a specified destination;
determine, from the automobile maintenance information obtained from the plurality of sensors, that the automobile requires a particular maintenance service;
present an advertisement that is selected based on the particular maintenance service, the location of the automobile, and the travel route;
present the status data in a central interface that can present status data received from a plurality of broadcasting devices; and send an activity level to the broadcasting computing device, wherein the activity level includes at least one of a bandwidth currently used by the receiving computing device and an amount of time since the receiving computing device has been accessed, and wherein an amount and a frequency of the status data received from the broadcasting computing device is based on the activity level of the receiving computing device.

12. The non-transitory computer-readable medium of claim 11, wherein the receiving computing device and the broadcasting computing device are running a form of an operating system that enables a computing device to transmit, receive and display the status data.

13. The non-transitory computer-readable medium of claim 11, wherein the status data indicates that the broadcasting device is unavailable and in response, the receiving computing device disables functionality that requires the availability of the broadcasting computing device.

14. The non-transitory computer-readable medium of claim 11, wherein the status data indicates an available bandwidth of the broadcasting device and the receiving computing device selects a performance option that includes transmitting data to the broadcasting device in a form determined to be optimal for the available bandwidth.

15. The non-transitory computer-readable medium of claim 11, further comprising instructions that cause the receiving computing device to:
select a performance option based upon the status data, wherein selecting the performance option includes adjusting settings of the receiving device.

* * * * *